United States Patent [19]
Flores

[11] Patent Number: 5,305,622
[45] Date of Patent: Apr. 26, 1994

[54] APPARATUS AND METHOD FOR LOCKING VALVES ON OIL TANKS, TANK TRAILERS AND THE LIKE

[76] Inventor: Carlos Flores, 1514 S. Kentucky, Roswell, N. Mex. 88201

[21] Appl. No.: 89,487

[22] Filed: Jul. 12, 1993

[51] Int. Cl.⁵ .................................. F16K 35/06
[52] U.S. Cl. ............................ 70/177; 70/178; 70/180; 137/385; 251/95
[58] Field of Search .................... 70/175-180; 137/385; 251/95

[56] References Cited

U.S. PATENT DOCUMENTS

| | | | |
|---|---|---|---|
| 674,582 | 5/1901 | Lewy | 70/176 |
| 812,021 | 2/1906 | Dahl | 70/180 |
| 1,003,211 | 9/1911 | Shepard | 70/178 |
| 1,040,040 | 10/1912 | Shepard | 70/180 |
| 1,067,549 | 7/1913 | Quigley | 137/385 |
| 1,245,770 | 11/1917 | Rideout | 70/176 |
| 1,316,412 | 9/1919 | Biggs | 70/180 |
| 1,541,801 | 6/1925 | Durning | 70/180 |
| 1,588,890 | 6/1926 | Horvath | 70/180 |
| 1,643,930 | 9/1927 | Mickler | 70/180 |
| 1,683,649 | 9/1928 | Belote | 70/180 |
| 1,780,994 | 11/1930 | Caldwell | 70/180 |
| 2,271,475 | 1/1942 | Clade | 70/180 |
| 3,006,181 | 10/1961 | Sarti | 70/180 |
| 3,362,426 | 1/1968 | Polit et al. | 70/179 |
| 3,980,099 | 9/1976 | Youngblood | 137/385 X |
| 4,208,893 | 6/1980 | Avrich et al. | 70/180 X |
| 4,630,456 | 12/1986 | Nielsen, Jr. | 70/178 X |
| 5,003,797 | 4/1991 | Wirth et al. | 70/180 |

FOREIGN PATENT DOCUMENTS 368453 3/1932 United Kingdom ............... 70/178

OTHER PUBLICATIONS

Brady, Signs, Tapes & Labels Catalog S-13, Feb. 1, 1993, p. 132.

Primary Examiner—Lloyd A. Gall
Attorney, Agent, or Firm—Victor Flores

[57] ABSTRACT

A lockout apparatus for use on a valve's latching mechanism. The lockout apparatus is a rigid framework formed to encage the exterior structure of a valve and to provide a locking structural member for selective locked securement of the valve's movable latching mechanism, by example in a closed position. The lockout apparatus is sized according to the diameter and size of a valve, by example a ball valve, and includes opposing open-ended structure for accommodating attachment of piping to the inlet and outlet ends of an encaged valve. The locking apparatus is useful in meeting environmental protection requirements for locking outside valves, typically ball valves, an oil tanks and tanker trailers to avoid vandalism and accidental spills.

9 Claims, 1 Drawing Sheet

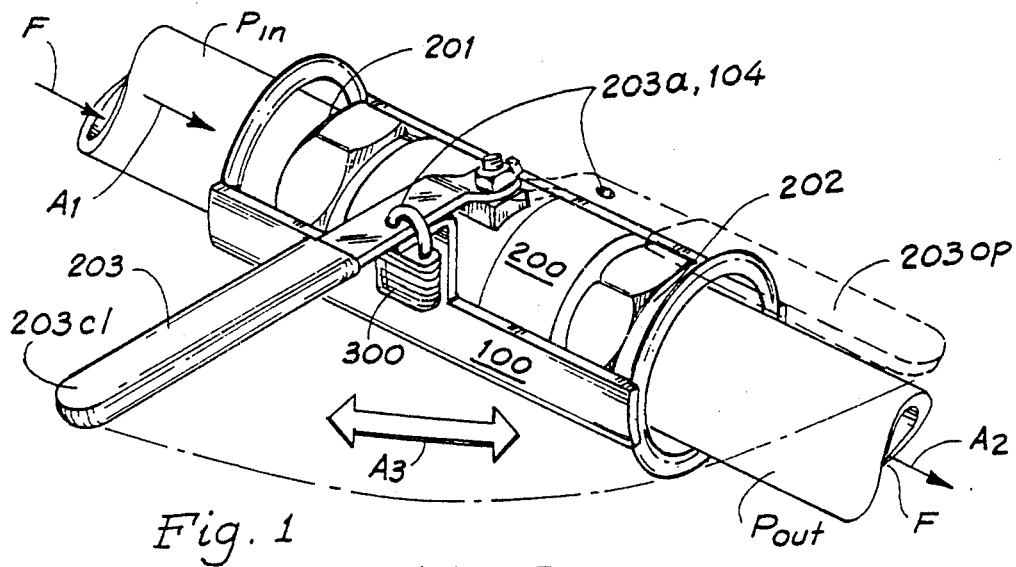
Fig. 1
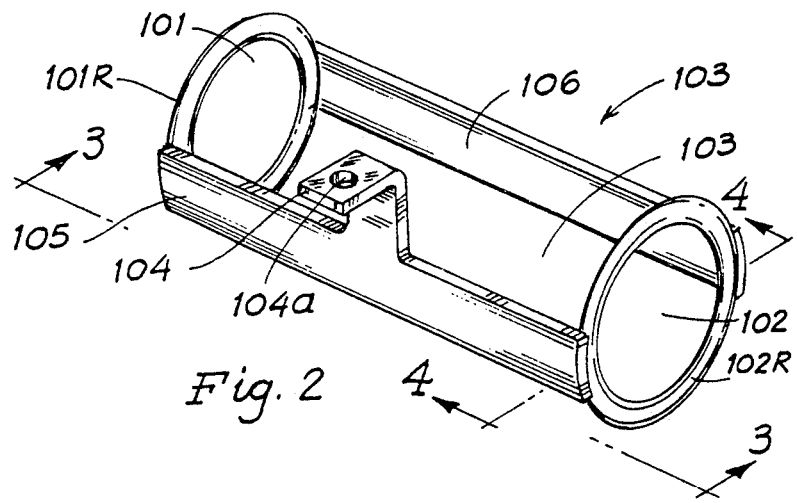
Fig. 2
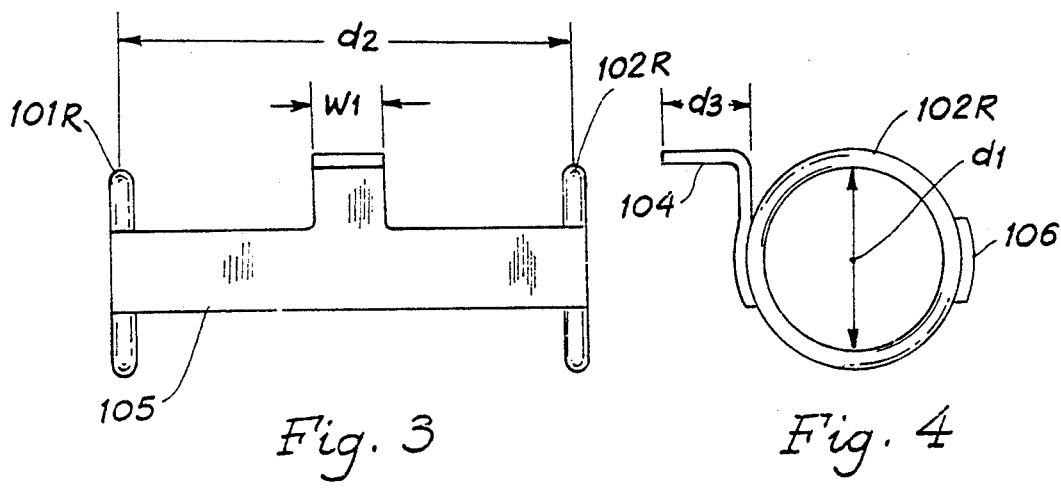
Fig. 3
Fig. 4

APPARATUS AND METHOD FOR LOCKING VALVES ON OIL TANKS, TANK TRAILERS AND THE LIKE

FIELD OF THE INVENTION

The present invention relates to apparatus for locking a valve's latching mechanism. More particularly, the present invention relates to lockout apparatus for locking a valve's movable latching mechanism in a closed position. Even more particularly, the present invention relates to lockout apparatus for locking ball valves on oil tanks and tanker trailers to avoid vandalism and accidental spills, and thus help meet environmental protection requirements.

BACKGROUND OF THE INVENTION

Valves are used extensively by industry in controlling the flow of fluids, by example oil and gas, from a storage facility to an end use application. The flow of the fluids may be controlled by valves located on pipelines, on transport trailers, or by valves on fluid storage tanks at a refinery or at a convenient fluid distribution center. As can be appreciated, when the fluid does involve oil and gas, the environmental protection officials, such as the Environmental Protection Agency (EPA), requires that the supplier of the oil and gas fluids take the proper precautions to lock the valves on the oil tanks and tanker trailers to avoid vandalism and accidental spills. While lockout devices are known, see for example the ball valve lockout device covered under U.S. Pat. No. 5,003,797, and illustrated at page 132 of BRADY, Signmark Division's, Catalog S-13, Effective February 1993, these known structures are detachable, costly, and do not encourage usage, either because of the cost, or because the device are not attached to the valves for immediate use when the need arises to lockout a valve.

Thus, a need is seen to exist for a valve lockout device that is more suitable for long term applications, rather than the shorter term maintenance lockout devices. A need is seen for a simple valve lockout structure that is designed for being installed on the valve to promote an immediate, and readily accessible use. A need is also seen for a simple valve lockout apparatus that is not costly, and which promotes availability and use to meet EPA requirements.

SUMMARY OF THE INVENTION

Accordingly, the primary object of the present invention is to provide a valve lockout apparatus for locking a valve's movable latching mechanism in either an open or closed position.

A particular object of the present invention is to provide a valve lockout apparatus for locking a ball valve's movable latching mechanism in a closed position to allow a supplier of oil and gas products to take the proper precautions to lock the valves on oil tanks and tanker trailers to avoid vandalism and accidental spills.

A more particular object of the present invention is to provide an inexpensive valve lockout apparatus having structure which is not readily detachable from the valve body and which promotes wide usage and compliance with EPA requirements such that a supplier of oil and gas products can take the proper precautions to lock the valves on the oil tanks and tanker trailers, and the like, to avoid vandalism and accidental spills.

The foregoing objects are accomplished by providing a valve lockout apparatus having a rigid framework formed to surround, in a cage-like manner, the exterior structure of a valve and to provide a locking structural appending member for selective attachment of a lock to the valve's movable latching/lever mechanism for locking the valve in a closed position. The locking apparatus is sized according to the diameter size of a valve, by example a ball valve, and includes opposing open-ended structure for accommodating attachment of piping to the inlet and outlet ends of the valve as well as structure to allow access to the movable lever. The lockout apparatus is useful in meeting environmental protection requirements for locking outside valves, typically ball valves, on oil tanks and tanker trailers to avoid vandalism and accidental spills.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating the preferred embodiment in which the invention may be practiced.

BRIEF DESCRIPTION OF THE DRAWINGS

FIG. 1 is a view of the present invention illustrated in use on a ball valve body, such as may be found on oil tanks and oil tanker trailers, also showing a valve's opening and closing lever engaged via a lock to the apparatus' locking structural appending member and also showing the valve's latch in an unlocked position.

FIG. 2 is a perspective view of the present invention, illustrating the rigid framework of the present invention, including the interface portions for the valve's inlet and outlet ports and the locking structure for locking a valve's latch thereto.

FIG. 3 is a side view of the present invention taken along lines 3—3 in FIG. 2.

FIG. 4 is an end view of the present invention taken along lines 4—4 in FIG. 2.

DESCRIPTION OF THE PREFERRED EMBODIMENT

FIG. 1 illustrates the valve lockout apparatus 100 of the present invention in use on a ball valve body 200, such as may be found on oil tanks and oil tanker trailers (not shown). FIG. 2 shows lockout apparatus 100 as a rigid framework structure 100 formed to contain the body of valve 200. Framework 100 is shown having a plurality of open framework interface portions 101, 102, 103 and a locking structural appending member 104 for securing a valve's lever 203 thereto with lock 300. End portions 101, 102 interface with a valve's inlet and outlet ports 201, 202 to allow installation of inlet and outlet piping Pin and Pout, while window 103 allows initial placement of valve 200 within framework 100 and allows subsequent access for opening and closing action of latch/lever member 203 as indicated by arrow A3 and enumerated as lever 203op, 203cl, respectively for the open and closed positions.

By example, the lockout apparatus 100 shown in FIG. 2 comprises rigid framework 100 formed having opposing rings 101R and 102R which delineate the open end portions 101 and 102, respectively. Rings 101R, 102R are interconnected by a plurality of interspaced cross members 105, 106. Cross member 105 has said locking structural appending member 104 formed thereon. Interspaced cross members 105, 106 delineate said window 103.

As noted earlier, and as best shown in FIGS. 3 and 4, lockout apparatus 100 is sized according to the diameter of a valve, by example ball valve 200. Thus, rings 101R, 102R, and included opposing open-ended portions 101, 102, are sized having a diameter d1 greater than a diameter of valve body 200 which is to be contained within framework 100. The diameter d1 not only facilitates placement of valve 200 within framework 100, but also accommodates attachment of piping pin, pout to the inlet and outlet ends 201, 202 of valve 200. The length of valve 200 must also be factored in manufacturing lockout apparatus 100. The length of lockout apparatus 100 is indicated in FIG. 3 as length d2. Length d2 may be greater than the length of valve 200 to accommodate a cradle-type fit within framework 100. The cradle fit within framework 100, along with the attached piping pin and pout, provide a substantially permanently located lockout apparatus. The removal of the lockout 100 is possible by reversing the installation procedure onto the valve and piping.

Although a hinged symmetrical framework is possible (not shown), and intended to be within the scope of the present invention, such hinged embodiment is not preferred because of drawbacks associated with inherent detachabilities and non-use because the lockout is not readily available.

The primary objective of lockout apparatus 100 is to provide structure for locking the valve lever 203 in either an open (203op), or closed (203cl) position. If both positions are to be secured, then locking structural appending member 104 would be duplicated and disposed appropriately on framework 100 to effect a secured state for both an open and a closed position of valve 200. As illustrated in FIG. 1, most applications of the present invention are to lock valve lever 203 in a closed valve position, shown as 203cl in an orthogonal relationship with respect to flow A1 and A2 of fluid F. Thus, appending member 104 is disposed in a similar orthogonal relationship with respect to cross members 105, 106. Lever 203 is typically provided with a securement eyelet 203a as a means for attaching to a lock. As illustrated in FIG. 2, appending member 104 is provided with eyelet 104a for purposes of providing an anchor point for immobilizing movable lever 203. Although, eyelet 104a is illustrated as a round hole, a slotted hole (not shown) would provide more flexibility of alignment with eyelet 203a and would allow for variations in the location of eyelet 203a on lever 203 for different brands, types of valves. The length d3 and width w1 of appending member 104 are selected to provide a rigid anchor point for the intended purpose of preventing vandalism and accidental spills. Applicant has found that a one-eighth inch thick steel strap having both d3 and w1 equal one inch, provides a strong, rugged anchor point for locking valve lever 203 using lock 300.

Thus, lockout apparatus 100 provides a method for meeting environmental protection requirements for locking outside valves on oil tanks and tanker trailers, and the like to avoid vandalism and accidental spills. Thus, a user would provide locking apparatus 100 in accordance with the present invention for use on a valve 200 having an externally accessible opening and closing latching mechanism 203. Apparatus 100 in the broadest embodiment would comprise framework 100 formed to encage an exterior body structure of valve 200. At least one appending member 104 would extend from framework 100 and be disposed on framework 100 in a latching alignment position with latching mechanism 203 for attachment of lock 300. Once a user has provided a lockout 100 according to the size of the valve to be locked, installation would entail placement of valve 200 within framework 100 and attaching the piping pin and pout as required to provide functional operation of valve 200 when desired, as shown by example with lever 203op positioned to allow fluid F to flow as indicated by arrow A2, or to lockout the flow of fluid F by positioning locking lever 203cl as shown in FIG. 1.

Therefore, while the present invention has been shown and described herein in what is believed to be the most practical and preferred embodiment, it is recognized that departures can be made therefrom within the scope of the invention, which scope is therefore not to be limited to the details disclosed herein but is to be accorded the full scope of the claims so as to embrace any and all equivalent apparatus.

I claim:

1. A method for meeting environmental protection requirements for locking outside lever operated valves on hazardous fluid tanks and tanker trailers to avoid vandalism and accidental spills, said method comprising the steps of:

(a) providing a lockout apparatus for use on a valve having an operating lever coupled to a valve mechanism for opening and closing a flow of fluid through said valve said lockout apparatus comprising:

an open framework comprising opposing ring members interconnected by a plurality of cross members that delineate at least one window, said open framework formed to encage an exterior body structure of said valve; and a structural member extending from a cross member said structural member having an anchor point for being in alignment with a securement point on said operating lever for attachment of a user provided lock to secure said operating lever to said structural member;

(b) providing a tank or tanker trailer for containing hazardous fluid and having said valve provided with said operating lever and needing to be locked to avoid vandalism and accidental spills of said hazardous fluid;

(c) installing said provided lockout apparatus by encaging said valve within said framework;

(d) manipulating said operating lever via said at least one window and aligning said anchor point with said securement point;

(e) locking said operating lever to said structural member such that said valve mechanism is maintained in a closed position; and (f) preventing vandalism and accidental spills of any contained hazardous fluid contained within said tank or tanker trailer.

2. A locking apparatus for locking a valve, said valve having inlet and outlet ports and an actuating member coupled to an operating lever, said apparatus comprising:

a structure formed to contain said valve, said structure having a plurality of open interface end portions for facilitating interface with said inlet and outlet ports and also having at least one open interface side portion for allowing manipulation of said operating lever when said valve is contained within said structure; and at least one appendage extending from said at least one open interface side portion, said at least one appendage having an anchor point disposed thereon for being in alignment with a securement point on said operating lever for locking said operating lever to said appendage when said valve is contained within said structure.

3. A locking apparatus as described in claim 2, wherein:
said plurality of open interface end portions comprise opposing rings interconnected by a plurality of interspaced cross members, said plurality of interspaced cross members forming said at least one open interface side portion, one of said cross members having said at least one appendage extending therefrom.

4. A locking apparatus as described in claim 2, wherein:
said anchor point comprises being disposed on said at least one appendage for locking said operating lever in a closed position.

5. A locking apparatus as described in claim 2, wherein:
said anchor point comprises being at least one appendage for locking said operating lever in an open position.

6. A locking apparatus as described in claim 2, wherein:
said at least one open interface side portion being used for receiving said valve for being contained within said structure.

7. A locking apparatus for locking a valve, said valve having inlet and outlet ports and an actuating member coupled to an operating lever, said apparatus comprising:
a rigid open framework comprised of opposing rings interconnected by a plurality of interspaced cross members that delineate an open window, one of said cross members having at least one appendage member extending therefrom and having an anchor point for being in alignment with a securement point on said operating lever for locking said operating lever to said appendage member when said valve is contained within said framework,
said opposing rings forming respective open interface portions for said inlet and outlet ports, and
said open window being used for receiving said valve and for manipulating said operating lever.

8. A locking apparatus as described in claim 7, wherein:
said at least one appendage member extending from said one cross member for locking said operating lever in a closed position.

9. A locking apparatus as described in claim 7, wherein:
said at least one appendage member extending from said one cross member for locking said operating lever in an open position.

* * * * *